United States Patent
Gansen

(10) Patent No.: US 9,612,137 B2
(45) Date of Patent: Apr. 4, 2017

(54) INSTRUMENT HOUSING WITH EMBEDDED LIQUID CRYSTAL DISPLAY WITHIN PLASTIC LAYER

(75) Inventor: Carl R. Gansen, Belle Plaine, MN (US)

(73) Assignee: Rosemount Inc., Eden Prairie, MN (US)

( * ) Notice: Subject to any disclaimer, the term of this patent is extended or adjusted under 35 U.S.C. 154(b) by 966 days.

(21) Appl. No.: 11/415,569

(22) Filed: May 2, 2006

(65) Prior Publication Data

US 2007/0268153 A1 Nov. 22, 2007

(51) Int. Cl.
*G09G 3/36* (2006.01)
*G01D 11/24* (2006.01)

(52) U.S. Cl.
CPC .................. *G01D 11/245* (2013.01)

(58) Field of Classification Search
CPC ................ G01D 11/245; G08C 19/16
USPC ............................... 345/87, 55, 204
See application file for complete search history.

(56) References Cited

U.S. PATENT DOCUMENTS

| | | | |
|---|---|---|---|
| 3,943,500 A | 3/1976 | Buchanan | 340/253 |
| 4,893,942 A * | 1/1990 | Stottmann | 366/279 |
| 5,184,064 A | 2/1993 | Vicknair et al. | 324/156 |
| 7,161,784 B2 * | 1/2007 | Cheung et al. | 361/111 |
| 2001/0040558 A1 * | 11/2001 | Takala et al. | 345/168 |
| 2003/0020456 A1 * | 1/2003 | Ayo et al. | 324/156 |
| 2003/0210375 A1 | 11/2003 | Sikharulidze | 349/187 |
| 2004/0045380 A1 | 3/2004 | Nelson et al. | |
| 2004/0144953 A1 | 7/2004 | Sikharulidze | 252/299.01 |
| 2004/0185185 A1 | 9/2004 | Kitson et al. | 428/1.1 |
| 2005/0094073 A1 | 5/2005 | Sikharulidze | 349/123 |
| 2005/0206831 A1 | 9/2005 | Sikharulidze | 349/177 |
| 2006/0114685 A1 * | 6/2006 | Seeber | 362/495 |

FOREIGN PATENT DOCUMENTS

| | | | |
|---|---|---|---|
| CN | 1678887 | 10/2005 | |
| EP | 1586875 | 10/2005 | |
| JP | 61-175522 | * 8/1986 | G01D 21/00 |
| JP | 3-243922 | 10/1991 | |
| JP | 2000-321160 | 11/2000 | |
| JP | 2005-538351 | 12/2005 | |
| WO | WO 2004-023080 | 3/2004 | |

(Continued)

OTHER PUBLICATIONS

"Notification of Transmittal of the International Search Report and the Written Opinion of the International Searching Authority, or the Declaration" PCT/US2007/010580, filed Jan. 5, 2007; 13 pages.

(Continued)

*Primary Examiner* — William Boddie
*Assistant Examiner* — Leonid Shapiro
(74) *Attorney, Agent, or Firm* — Westman, Champlin & Koehler, P.A.

(57) ABSTRACT

A process transmitter has a housing that contains transmitter circuitry. The transmitter circuitry is configured to provide a display output and is also configured to couple to a process control loop. A LCD display is embedded within a transparent or translucent polymeric layer in the housing. The LCD display is coupled to the display output and is configured to display information through the polymeric layer.

21 Claims, 5 Drawing Sheets

(56) References Cited

FOREIGN PATENT DOCUMENTS

WO     WO 2004023080 A1 *   3/2004
WO     WO 2006/044700        4/2006

OTHER PUBLICATIONS

"Communication pursuant to Article 94(3) EPC" for Application No. 07776586.5-1236 dated Mar. 4, 2009; 4 pages.
Office Action from related Chinese Application No. 200780015752.3, dated Jan. 29, 2010.
"HP Labs demos plastic LCDs", L. Sherriff, published Oct. 19, 2004; http://www.theregister.co.uk/2004/10/19/plastic_lcd/.
"HP researchers show prototype of printed, plastic, color display", Oct. 2004, http://www.hpl.americas.hp.net/news/2004/oct_dec/bistable_display.html.
"HP offers peek at future computer monitors", Scarlet Pruitt, Oct. 19, 2004; http://www.computerworld.com/hardwaretopics/hardware/story/0,10801,96779,00.html? nas=AM-96779.
"HP offers peek at future of large, plastic displays", IDG News Service Oct. 19, 2004, http://www.itworld.com/Comp/1874/041019hpdisplay/pfindex.html.
"Plastic technologies go on display", Jan. 2005, http://www.cieonline.co.uk/cie2/articlen.asp?pid=480&id=5110.
"New display 'as clear as a glossy magazine'", Exclusive from New Scientist Print Edition, Barry Fox, http://www.newscientist.com/article.ns?id=dn6557.
Rejection Decision from related Chinese Application No. 200780015752.3, dated Oct. 29, 2010.
First Japanese Office Action (with English translation) for corresponding Japanese Patent Application No. 2009-509673, dated Jan. 31, 2012, 6 pages.
Reexamination Notice for Chinese Patent Application No. 200780015752.3, issued Oct. 19, 2012, 4 pages.
Decision of Reexamination issued by the Chinese Patent Reexamination Board for Chinese Patent Application No. 200780015752.3, dated Apr. 26, 2013, 20 pages.
Final Office Action (Notification of Reasons for Rejection) for Japanese Patent Application No. 2009-509673, dispatch date Mar. 26, 2013, 5 pages.
Chinese Office Action from Chinese Patent Application No. 2007800157523, dated May 3, 2012.
Office Action from corresponding Chinese Patent Application No. CN201310205869.5, dated Feb. 11, 2015.
Office Action from corresponding Chinese Patent Application No. CN201310205869.5, dated Aug. 18, 2015.

* cited by examiner

US 9,612,137 B2

INSTRUMENT HOUSING WITH EMBEDDED LIQUID CRYSTAL DISPLAY WITHIN PLASTIC LAYER

BACKGROUND OF THE INVENTION

The present invention relates generally to industrial process transmitters. More particularly, the present invention relates to a visual display on a process transmitter.

Industrial process transmitters couple to industrial process equipment and/or conduits and are adapted to measure process parameters, such as pressure, mass flow rate, volume flow rate, temperature, and the like. Frequently, such transmitters draw power from a two-wire loop that carries an energy limited loop current, which varies within a range of 4-20 mA.

In some configurations, transmitters can utilize primary and secondary process measurements, using multiple sensors or field devices. For example, to calculate a mass flow measurement of gas or steam through a pipe, a flowmeter can be used to measure the volume flow rate, and a second sensor can be used to measure the line pressure.

The transmitter typically sends a signal related to a value of the process variable to a remote location such as a control room. Some transmitters also display a readout of the value of the process variable or other information on a panel of the transmitter housing. Advancements in transmitters have included a digital readout of the actual value of the process variable on a liquid crystal display (LCD) in the transmitter housing.

SUMMARY OF THE INVENTION

The present invention includes a process transmitter having a housing that contains transmitter circuitry. The transmitter circuitry is configured to provide a display output. A LCD display is embedded within a transparent or translucent polymeric layer in the housing. The LCD display is coupled to the display output and is configured to display information through the polymeric layer.

DETAILED DESCRIPTION

Industrial process transmitters contain circuitry for measuring a process variable and for communicating, for example, with a communications network, such as a 4-20 mA two-wire process control loop. The transmitter circuitry requires a quiescent current (typically less than 4 mA) for standard operation. Embodiments of the present invention employ transmitter circuitry configured to couple to a process control loop. The transmitter circuitry is also configured to provide a display output that is coupled to a liquid crystal display (LCD) that is embedded in a housing of the transmitter.

Figure 1:
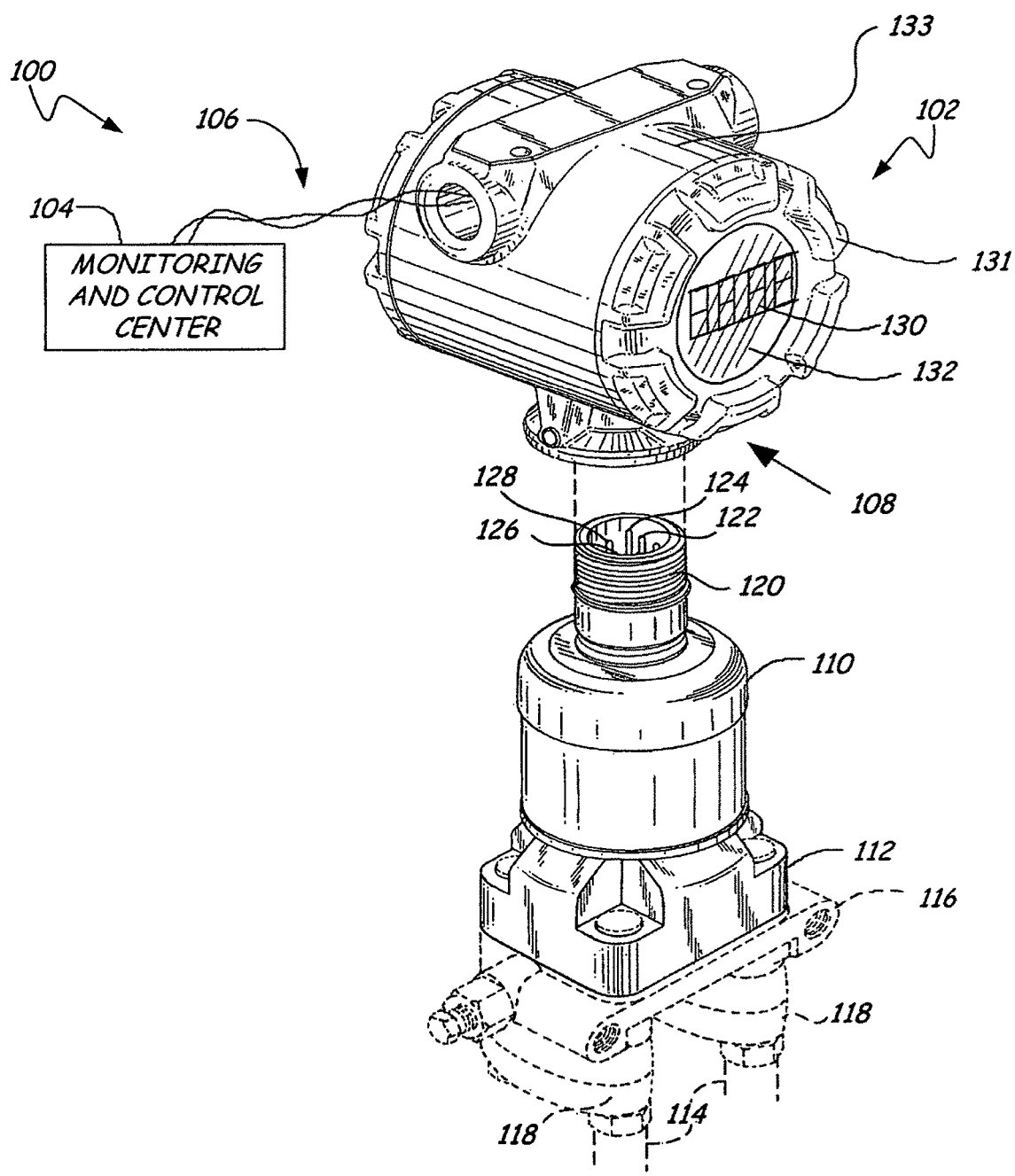
FIG. 1 is a perspective view of a process transmitter of the present invention having a liquid crystal display embedded in a panel of an end cap of the transmitter housing.

FIG. 1 illustrates an industrial process monitoring and control system 100 that includes a transmitter 102 that is coupled to a process monitoring and control center 104 by a process control loop 106. In one example, the process control loop is a two-wire process control loop 106 that carries a 4-20 mA current and is used for powering and communicating with the transmitter 102. Such a process control loop may operate in accordance with the HART® or Foundation™ Fieldbus protocol. Further, such process control loop may also implement various wireless techniques.

The process monitoring and control center 104 can be, for example, a control room with one or more computer systems coupled to a network and adapted to communicate with one or more field devices and/or transmitters that are coupled to an industrial process.

The transmitter 102 illustrated in FIG. 1 is a two-wire, modular differential pressure transmitter that uses the two wire process control loop 106 for a power supply as well as to transfer a signal. For example, the two-wire process control loop can use 4-20 mA signaling techniques and digital communication techniques, such as HART®, Fieldbus, Profibus, and other communication protocols. Alternatively, the process control loop may implement various wireless techniques. The modular differential pressure transmitter 102 is only one example of a suitable process monitoring and control device and is not intended to suggest any limitation as to the scope of use or functionality of the invention.

The transmitter 102 includes a feature module 108 having a LCD 130 embedded within an end panel 132 of an end cap 131. The end cap 131 is threadably secured to a housing 133 of the feature module 108.

The end panel 132 is preferably constructed of a transparent or translucent polymeric or plastic material such that the embedded LCD 130 is viewable through the panel 132. As used herein, transparent means having the property of transmitting light without appreciable scattering so that bodies lying beyond are seen clearly. As used herein, translucent means having the property of transmitting and diffusing light such that an object cannot be seen clearly. As used herein, plastic means an organic, synthetic or processed material that is a thermoplastic or thermosetting polymer of high molecular weight and that can be made into objects, films or filaments. As used herein polymer means a chemical compound or mixture of compounds formed by polymerization.

In this example, the transmitter 102 also includes an electronics housing 110 and a process coupling 112. The process coupling 112 can be attached to a pipe or conduit of an industrial process, such as a pipe 114, with a flange 116 and flange adapter unions 118, all of which are shown in phantom.

Figure 6:
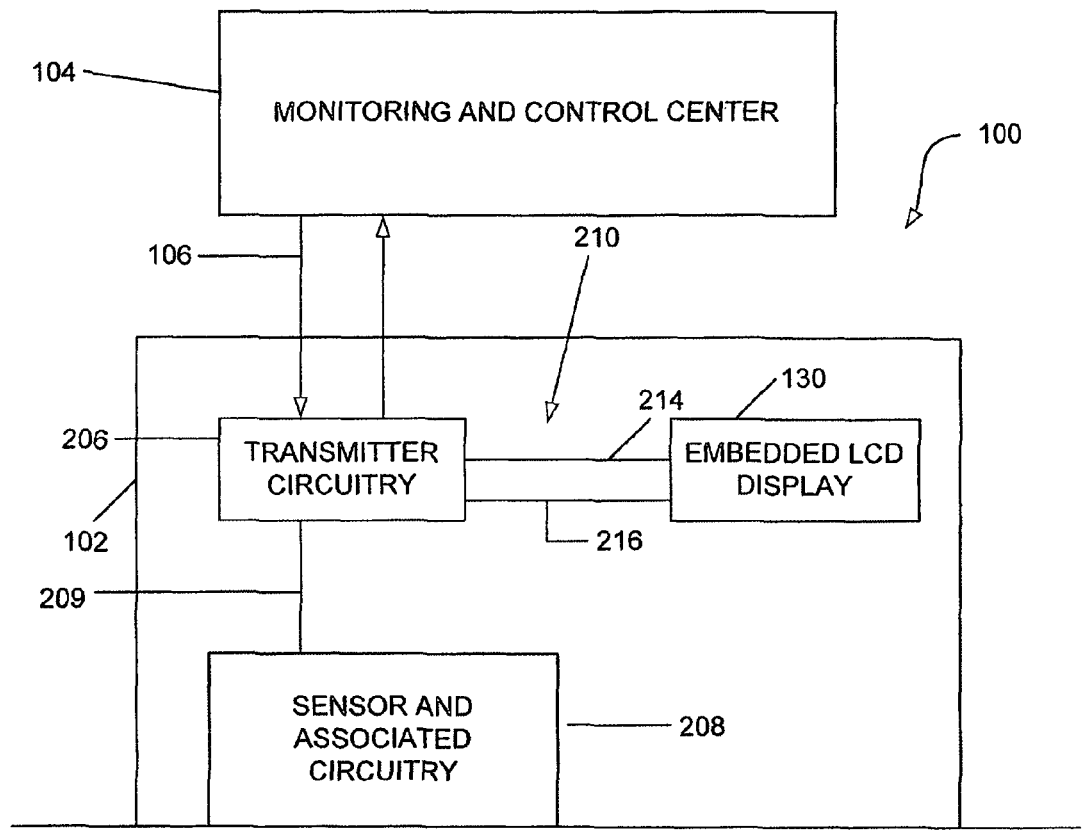
FIG. 6 is a simplified block diagram of the industrial process monitoring and control system.

The electronics housing 110 encloses transmitter circuitry 206 (shown in FIG. 6). The housing 110 also includes a connector 120 that houses a plurality of contacts including a bus contact 122, a common contact 124, and loop wiring contacts 126, 128. The bus contact 122 and the common contact 124 couple the transmitter circuitry 206 within the electronics housing 110 to any of various loads within the feature module 108 such as display output circuitry that supplies power and a signal to the embedded LCD 130.

The embedded LCD 130 is adapted to display information to an operator in the field, such as the value of the process variable. A non-exhaustive list of process variables that can be measured and displayed on the embedded LCD 130 include a temperature, a pressure, a flow rate and a level. The LCD 130 can also display a value of a secondary process variable that is determined with calculator circuitry in the transmitter circuitry 206 where the calculator circuitry correlates the signal from the sensor to the value of the secondary process variable.

Besides displaying a numeric value of a process variable, the embedded LCD 130 can also display a set point, a current level, diagnostic information and alarms. The embedded LCD 130 can also communicate process information by displaying a color to indicate whether the value of the process variable is above or below the setpoint or has set off an alarm, for instance.

Figure 2:
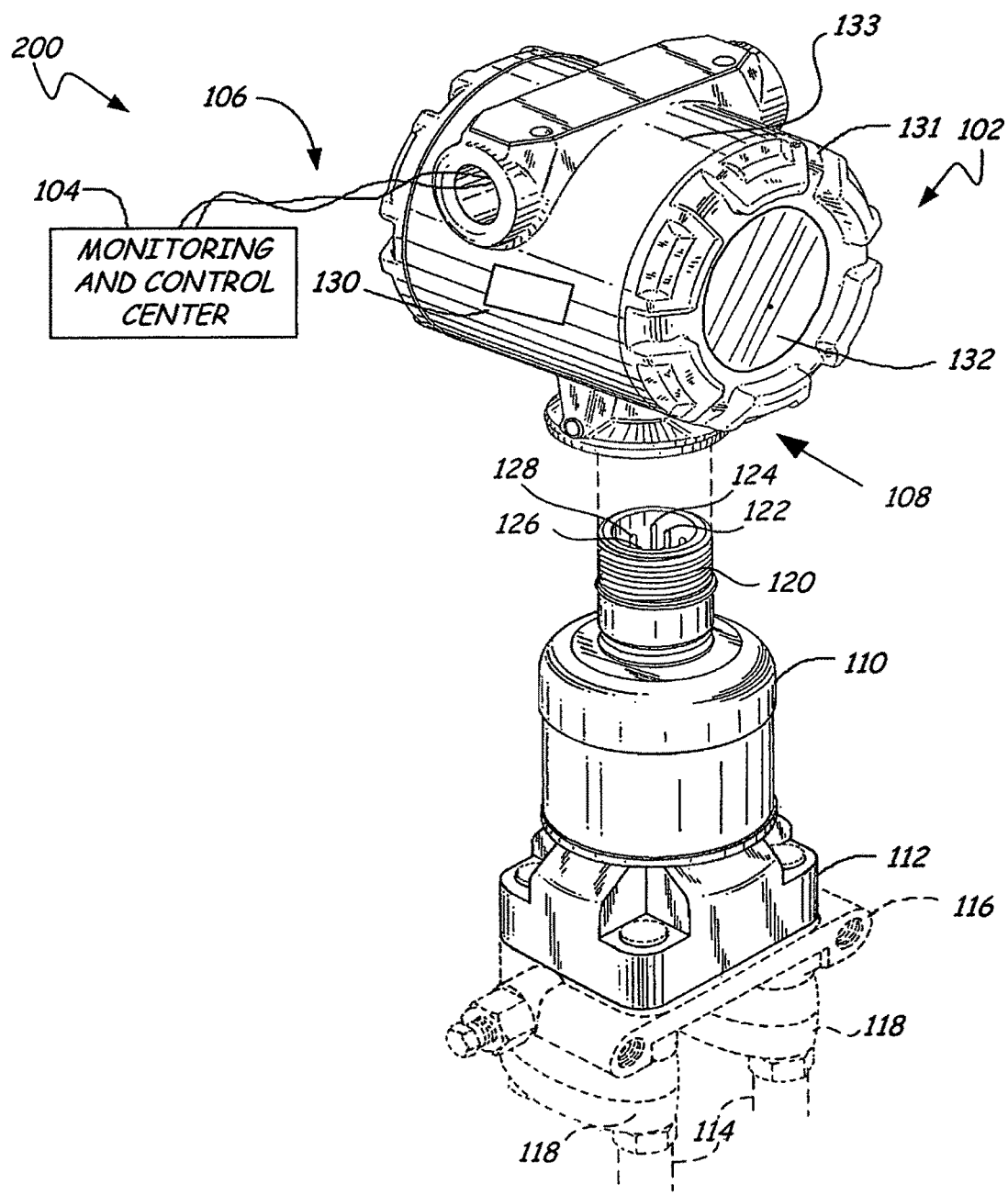
FIG. 2 is a perspective view of the process transmitter of the present invention having an embedded LCD in a side panel of the transmitter housing.

Referring to FIG. 2, the LCD 130 may alternatively be embedded within a side panel 133 of the feature module 108 where at least an outer layer of the side panel 133 is constructed from the transparent or translucent polymeric or plastic material. However, the LCD 130 may be embedded within any viewable surface of the transmitter 100.

Figure 3:
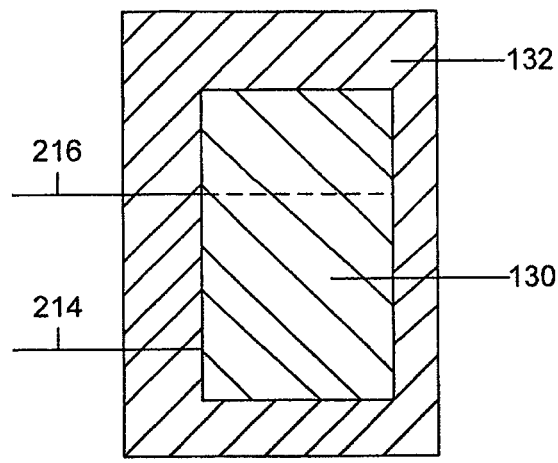
FIG. 3 is a sectional view of the embedded LCD within a polymeric layer in the housing.

Referring to FIG. 3, the LCD 130 is embedded within the panel 132 that is constructed from the transparent or translucent polymeric material. Power is supplied from the transmitter circuitry 206 (as shown in FIG. 6) through a wire 216. A signal is transmitted to the LCD 130 from the transmitter circuitry 206 (as shown in FIG. 6) through a wire 214 such that the LCD 130 communicates the desired process information. The wires 214, 216 are coupled to electrodes of the LCD 130 that are positioned on opposite sides of liquid crystal material to display the desired process information. The wires 214, 216 are also of a length that allows the wires 214, 216 to twist as the end cap 131 is threadably secured to the housing 133.

Figure 4:
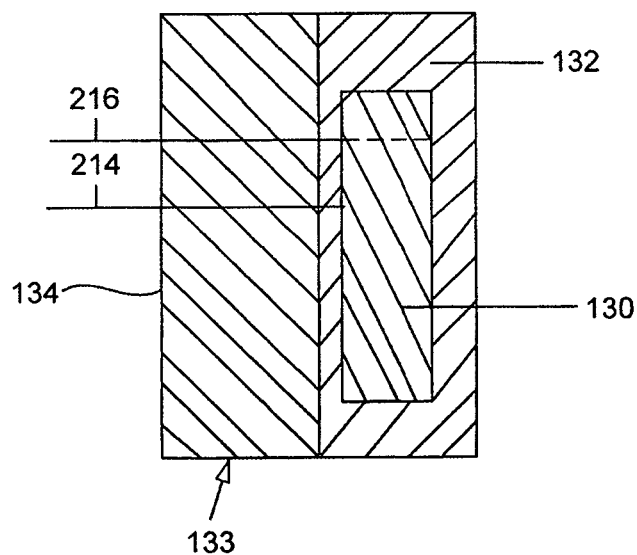
FIG. 4 is a sectional view of the embedded LCD within a polymeric layer in the housing supported by a metallic layer.

Referring to FIG. 4, the LCD 130 can be embedded within transparent or translucent polymeric or plastic layer 132 of the side panel 133 having an interior metal layer 134. While the metal layer 134 is typical for supporting the transparent or translucent layer 132, the layer 134 can be constructed from any material that provides the structural integrity to support the layer 136 when the layer 134 is typically opaque. Power and the signal are sent to the embedded LCD through the wires 214 and 216 to communicate the desired process information.

Because the LCD 130 is embedded within the layer 132, the LCD 130 is sealed from the outside environment and will not spark a fire during use in a potentially combustible environment. Therefore, the embedded LCD 130 displays information in an intrinsically safe manner such that the process transmitter 10 having the embedded LCD 130 can be utilized in potentially combustible environments.

Figure 5:
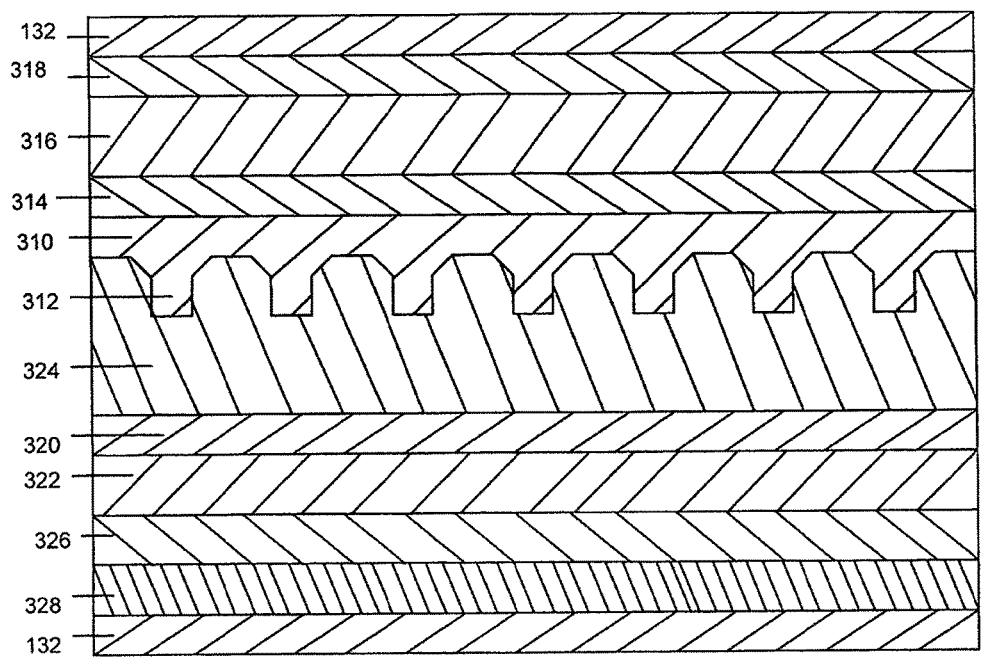
FIG. 5 is a sectional view of the embedded LCD.

Referring to FIG. 5, the LCD 130 is preferably constructed by utilizing a polymeric sheet 310 with a plurality of posts 312 extending from the sheet 310. The posts 312 are typically about one micron in width and height where several posts 312 can be contained within a space of a typical pixel. An electrode 314 is attached to the polymer sheet 310 and is connected to the wire 214 to provide a charge to selected posts 312 which activates a pixel. A transparent plastic or polymeric sheet 314 that is typically polycarbonate is attached to the electrode 312. A polarizer 318 is attached to the transparent plastic or polymeric sheet 314.

A second transparent polymeric sheet 320 having a second electrode 322 attached thereto is positioned proximate the first sheet 310. Red, blue and green color filter 326 may optionally positioned between the second electrode 322 and a second transparent plastic or polymeric sheet 328 to provide a color display. However, a gray-scale display is also within the scope of the present invention.

Liquid crystal material 324 is positioned between the two polymeric sheets 310, 320 to complete the LCD 130. The plastic LCD 130 is flexible and is thinner than a typical LCD. Because of the flexibility and thinness of the LCD 130, the LCD 130 is easily embedded into either a flat or contoured polymeric or plastic layer 132.

When a signal and power are sent to a post 312 via the wires 214, 216 the liquid crystal material 324 polarizes and takes on a shade or color. The cells are coordinated to define the display. The plastic LCD 130 is disclosed in articles entitled HP Labs Demos Plastic LCD at www.theregister-co.uk/2004/10/19/plastic lcd/ and New display 'as clear as a glossy magazine' at www.newscientist.com/articale.ns?id=dn6557 both of which are incorporated by reference in their entireties.

FIG. 6 is a simplified block diagram of one embodiment of the industrial process monitoring and control system 100. The system 100 includes the transmitter 102 and the process monitoring and control center 104 that are coupled by the two-wire process control loop 106.

The transmitter 102 includes the transmitter circuitry 206 which is coupled to a sensor and associated sensor circuitry 208 with a wire 209. A value of a process is variable is sensed by the sensor and associated sensor circuitry 208 which converts the value to a signal and sends the signal via the wire 209 to the transmitter circuitry 206.

The transmitter circuitry 206 includes a display output 210 that is coupled to the embedded LCD 130. The display output 210 provides a signal to the embedded LCD 130 via wire 214 and power via wire 216 such that the embedded LCD 130 provides a value of the process variable.

Although the present invention has been described with reference to preferred embodiments, workers skilled in the art will recognize that changes may be made in form and detail without departing from the spirit and scope of the invention.

What is claimed is:

1. A process transmitter comprising:
a housing having a metal layer with an external surface, wherein the housing is sealed from an outside environment;
transmitter circuitry in the housing configured to provide a display output and configured to couple to a process control loop;
a transparent or translucent polymeric layer mounted on the external surface of the metal layer of housing; and
a thin flexible LCD display mounted externally to the housing on the external surface of the metal layer of the housing and embedded within the polymeric layer coupled to the display output and configured to display information through the polymeric layer and extending over the external surface of the metal layer of the housing, wherein the housing comprises an opaque inner layer providing the external surface and the polymeric layer comprises a coating on the exterior surface or forms an outer wall over the metal layer of the housing, the thin film flexible LCD sealed from the outside environment and configured to suppress sparks during use in potentially combustible environments, whereby the thin flexible LCD display displays information in an intrinsically safe manner such that the process transmitter can be used in potentially combustible environments.

2. The transmitter of claim 1 and wherein the LCD display couples to the transmitter circuitry to display a value of a process variable.

3. The transmitter of claim 1 and wherein the polymeric layer comprises a portion of an outer layer of the housing.

4. The transmitter of claim 2 wherein the LCD display indicates a numerical value of the process variable.

5. The transmitter of claim 1 wherein the LCD display indicates a value of a process variable with a color.

6. The transmitter of claim 1 wherein the process variable comprises a temperature, a pressure, a flow rate or a level.

7. The transmitter of claim 1 wherein the thin flexible LCD display conforms to a contour of the external surface of the metal layer of the housing.

8. A process transmitter for transmitting a signal from a sensor comprising:
  a housing having a metal layer with an exterior surface which carries a transparent or translucent polymeric layer on at least a portion of an exterior surface, wherein the housing is sealed from an outside environment;
  transmitter circuitry in the housing for accepting the signal from the sensor and configured to provide a display output and configured to couple to a process control loop;
  a thin flexible LCD display extending over at least a portion of the exterior surface of the metal layer, located externally to the housing and embedded in the polymeric layer and coupleable to the display output and configured to display information through the polymeric layer, wherein the housing comprises an opaque inner layer providing the external surface and the polymeric layer comprises a coating on the exterior surface or forms an outer wall over the metal layer of the housing, the thin film flexible LCD sealed from the outside environment and configured to suppress sparks during use in potentially combustible environments, whereby the thin flexible LCD display displays information in an intrinsically safe manner such that the process transmitter can be used in potentially combustible environments.

9. The transmitter of claim 8 wherein the LCD display indicates a value of a process variable being determined by the sensor.

10. The process transmitter of claim 9 wherein the LCD display indicates a numeric value of the process variable determined by the sensor.

11. The process transmitter of claim 9 wherein the LCD display indicates a value of the process variable determined by the sensor with a color.

12. The process transmitter of claim 9 wherein the transmitter circuitry comprises a calculator that converts the signal from the sensor to determine a value of a secondary process variable that correlates to the signal from the sensor and wherein the LCD displays the secondary process value.

13. The process transmitter of claim 9 wherein the process variable comprises a temperature, a pressure, a flow rate or a level.

14. The transmitter of claim 8 wherein the housing supports a transparent polymeric material or a translucent polymeric material for embedding the LCD display.

15. The transmitter of claim 14 wherein the transparent or translucent polymeric material comprises a portion of the housing.

16. The process transmitter of claim 8 wherein the housing comprises:
  an opaque inner layer having an exterior surface; and
    a coating on the exterior surface of the inner layer and wherein the LCD display is embedded within the coating.

17. The transmitter of claim 8 the thin flexible LCD display conforms to a contour of the exterior surface of the metal layer of the housing.

18. A method of displaying process information on a process transmitter metal housing comprising:
  sensing a value of a process variable with a sensor;
  providing a signal from the sensor to a transmitter circuitry contained within a metal layer of a housing of the process transmitter, wherein the housing is sealed from an outside environment;
  mounting an LCD display on an exterior surface of the metal layer of the housing and located exterior to the housing;
  embedding the LCD display in a polymeric layer which covers at least a portion of the exterior surface of the metal layer of the housing;
  wherein the housing comprises an opaque inner layer providing the external surface and the polymeric layer comprises a coating on the exterior surface or forms an outer wall over the metal layer of the housing,
  sending a signal from a display output of the transmitter circuitry to a thin flexible liquid crystal display that is embedded with a polymeric layer which extends over the metal layer of the housing; and
  displaying information on the embedded liquid crystal display through the polymeric layer, wherein the thin film flexible LCD sealed from the outside environment and configured to suppress sparks during use in potentially combustible environments, whereby the thin flexible LCD display displays information in an intrinsically safe manner such that the process transmitter can be used in potentially combustible environments.

19. The method of claim 18 wherein the information displayed is a numeric value of the process variable.

20. The method of claim 18 wherein the information displayed is a color that corresponds to a value of the process variable.

21. The method of claim 18 including conforming the thin flexible liquid crystal display to a contour of the exterior metal layer of the housing.

* * * * *